(No Model.)
C. E. DURYEA.
BICYCLE.
No. 350,583. Patented Oct. 12, 1886.
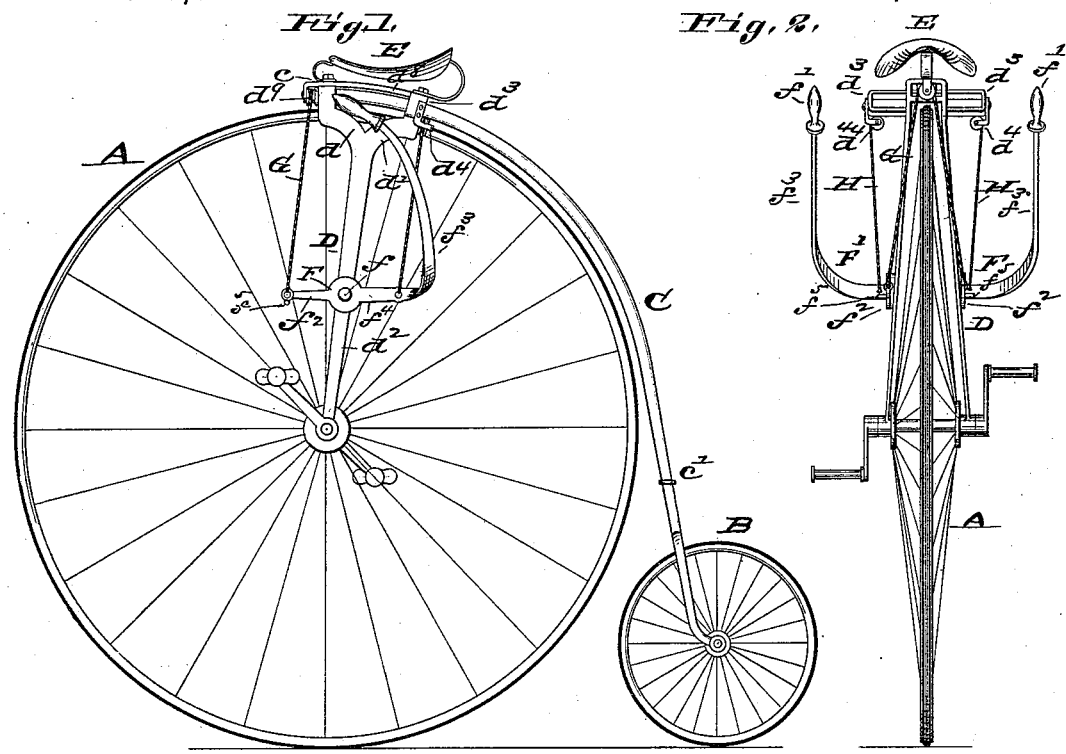
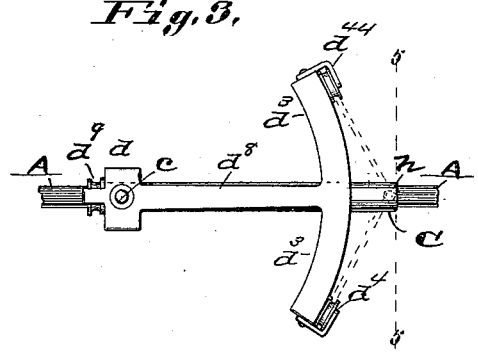
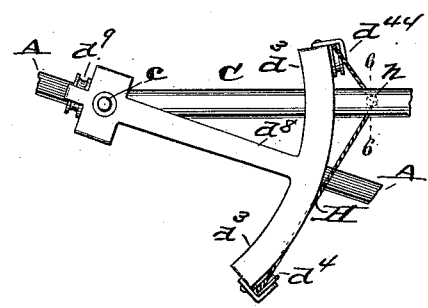
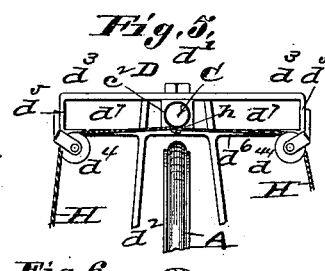
Attest:
J. W. Hoke.
John Schaffer
Inventor:
Charles E. Duryea
by C. D. Moody
atty
N. PETERS, Photo-Lithographer, Washington, D. C.

UNITED STATES PATENT OFFICE.

CHARLES E. DURYEA, OF ST. LOUIS, ASSIGNOR OF TWO-THIRDS TO GERRIT H. TEN BROEK, OF ST. LOUIS, AND CHARLES D. MOODY, OF WEBSTER GROVES, MISSOURI.

BICYCLE.

SPECIFICATION forming part of Letters Patent No. 350,583, dated October 12, 1886.

Application filed July 13, 1885. Serial No. 171,546. (No model.)

*To all whom it may concern:*

Be it known that I, CHARLES E. DURYEA, of St. Louis, Missouri, have made a new and useful Improvement in Bicycles, of which the following is a full, clear, and exact description.

The improvement relates to that class of bicycles in which the handle-bar is dispensed with, and the steering is effected by means of handles at the sides of the rider.

The annexed drawings, making part of this specification, exhibit a bicycle having the improvement.

Figure 1 is a side elevation of the bicycle. Fig. 2 is a front elevation. Fig. 3 is a detail, being a top view upon an enlarged scale of the fork. The view includes a portion of the backbone and of the wheel-rim. Fig. 4 is a view similar to that of Fig. 3, but showing the wheel-rim and fork out of line with the backbone. Fig. 5 is a cross-section on the line 5 5 of Fig. 3, and Fig. 6 is a section on the line 6 6 of Fig. 4.

The same letters of reference denote the same parts.

The large front wheel, A, the small rear wheel, B, and the backbone C of the bicycle are substantially of the customary form. The backbone is also connected with the small wheel in the customary way. Its connection with the large wheel is somewhat modified.

D represents the fork. It straddles the wheel A, and is attached thereto in the usual manner. At its upper end the fork is widened or extended in the direction of the plane of the wheel A, the object of which extension is to provide a support for the saddle E, as well as bearings used in turning the wheel A. The extension at or toward its rear end can also be utilized to carry a guide for the backbone as the large wheel is turned to the right or left. One, and perhaps the preferable, mode of thus extending the fork at its upper end is exhibited in the drawings, the fork, where it passes over the wheel, being divided into the branches $d\ d'$, which extend, respectively, forward and backward of the longitudinal axis of the main portion $d^2$ of the fork. The backbone is pivoted at $c$ to the branch $d$ of the fork. The branch $d'$ is extended laterally at $d^3\ d^3$ to each side of the large wheel, and the extensions are each provided with a bearing in the form, preferably, of the sheave $d^4\ d^{14}$. Each extension at its outer end is furnished with a shoulder, $d^5$, and by means of the lower bar, $d^6$, a slot, $d^7$, extending from one shoulder $d^5$ to the other shoulder $d^5$, is formed in the fork. The backbone passes through a block, $c^2$, Fig. 5, and as the large wheel is turned to the right or left the block (and the included backbone) slides to and fro in the slot $d^7$. The backbone, being thus supported at a point in rear of its pivot $c$, obviates the necessity, as hitherto has been the case, of extending the pivot $c$ vertically in front of the saddle. The bar $d^8$ may be used to connect the branches $d\ d'$. A sheave, $d^9$, is attached to the branch $d$ above the wheel A. The saddle E rests upon the branches $d\ d'$.

The bicycle is guided as follows: F F' represent levers pivoted to the fork at $f$ respectively at opposite sides of the wheel A. These levers are similarly extended backward from the fork, laterally outward from the wheel A, and thence upward and forward, and terminating in or being provided with handles $f'$, which are in a convenient position to be grasped by the rider's hands when at his sides. The levers F F' are also extended at $f^2$, Figs. 1, 2. A cord, G, passes from one extension $f^2$ upward over the sheave $d^9$, and thence downward to the other extension $f^2$ on the opposite side of wheel A. Another cord, H, extends from one lever, F, upward over the sheaves $d^4\ d^{14}$, Fig. 5, and thence downward to the opposite lever, and between the sheaves $d^4\ d^{14}$ at $h$ the cord H is fastened to the backbone C, Figs. 3, 4, 5, 6, or what is the equivalent, a cord H leads from the lever F, Fig. 1, upward over the sheave $d^4$, and is fastened to the backbone at $h$, and a similar cord H leads from the opposite lever, F', upward over the sheave $d^{14}$, and is fastened to the backbone at $h$. The rider desiring to turn, say, to the right, throws the handle $f'$ of the lever F forward and the handle $f'$ of the lever F' backward. This causes the wheel A to be turned to the right, as indicated in Fig. 4, for the rear end of the lever F is thrown upward, and the rear end of the lever F' is thrown downward, the effect of which is to turn the wheel A and fork in the way described. The saddle being attached to the fork turns with the wheel. When the motions of the levers F F' are reversed, the wheel, fork, and saddle are swung in the opposite direction. The cord G is useful in that it enables each lever to restore the opposite lever from a rearwardly-inclined position to an upright position. It also enables the bicycle to be guided with one only of the levers F F'. It is not essential that the levers F F' be carried outward from the sides of the wheel A before carrying them upward. They might be carried directly upward so as to be between the rider's legs and the wheel; also the upright portion $f^3$ of the levers might be connected with the horizontal portion $f^4$ at some other point than as shown. It is preferable, however, to carry the levers outward so as to come on the outer side and in rear of the rider's legs, as represented, as thereby the levers can be operated to advantage, a better upward pull on the lever-handles can be obtained, and no obstacle is in front of the rider in dismounting. The bicycle is thus capable of being propelled to better advantage, and is safer to ride.

In mounting, the rider places one foot on the step $c'$, and then passes his other foot between the cord H and the lever F'. Upon each of the levers F F' is a short lateral projection, $f^5$, which forms a foot-rest; also, by pressing the feet upon these projections the levers F F' can be moved and the bicycle thereby guided.

I claim—

1. A bicycle having the guiding-levers F F', pivoted to the bicycle-fork and provided with the projections $f^5$ $f^5$, and combined with the ropes G and H, as and for the purpose described.

2. The combination, in a bicycle in which the large wheel is at the front, of the wheel A, the fork D, straddling the wheel and widened at its upper end in the direction of the plane of the wheel into branches $d$ $d'$, and the saddle attached to said branches and directly over said fork, substantially as described.

3. The combination, in a bicycle, of the wheel A, the fork D, extended at its upper end in the direction of the plane of said wheel and also laterally from each side of the wheel, to provide bearings at the rear of the pivotal point of the backbone for turning the wheel A, substantially as described.

4. The combination of the wheels A B, the backbone C, the fork D, extended as described, and provided with the bearings $d^4$ $d^{44}$ $d^9$, the saddle E, the levers F F', and the cords G H, substantially as described.

5. The combination of the wheels A B, the backbone C, the fork D, extended as described, and provided with the bearings $d^4$ $d^{44}$, the saddle E, the levers F F', and the cord H, substantially as described.

6. A bicycle whose saddle is placed over the longitudinal axis of the main part of the fork, and moves with the fork and forward large wheel and swings laterally on the backbone, substantially as described.

7. In a bicycle having the large wheel at the front, a fork straddling the wheel having at its upper end branches $d$ $d'$, extended in the direction of the plane of the wheel, respectively, forward and backward of the longitudinal axis of the main part of said fork, substantially as and for the purposes described.

8. A bicycle whose fork at its upper end is extended laterally to provide bearings at each side of the wheel over which ties are carried to the backbone, substantially as described.

9. A bicycle having its saddle attached to the upper end of its fork, and having levers F F', pivoted to the fork at each side thereof and combined with the backbone C, as and for the purposes set forth.

10. The combination of the wheel A, the fork D, the bearing $d^9$, the levers F F', extended at $f^2$ $f^2$, and the cords G and H, and the backbone C, substantially as described.

11. The combination, in a bicycle, of the fork D, having the slot $d^7$, with the backbone C, substantially as described.

Witness my hand.

CHARLES E. DURYEA.

Witnesses:
 C. D. MOODY,
 H. I. COE.